(12) United States Patent
Steinbrueck et al.

(10) Patent No.: US 8,404,117 B1
(45) Date of Patent: Mar. 26, 2013

(54) SYSTEM FOR CONTROLLING WATER IN AN AQUATIC FACILITY

(71) Applicant: BECS Technology, Inc., St. Louis, MO (US)

(72) Inventors: Brett D. Steinbrueck, Webster Groves, MO (US); Darren Greenwalt, III, Manchester, MO (US)

(73) Assignee: BECS Technology, Inc., St. Louis, MO (US)

( * ) Notice: Subject to any disclaimer, the term of this patent is extended or adjusted under 35 U.S.C. 154(b) by 0 days.

(21) Appl. No.: 13/686,341

(22) Filed: Nov. 27, 2012

Related U.S. Application Data

(62) Division of application No. 12/366,970, filed on Feb. 6, 2009.

(60) Provisional application No. 61/065,052, filed on Feb. 8, 2008.

(51) Int. Cl.
*B01D 61/00* (2006.01)
*F04B 49/00* (2006.01)

(52) U.S. Cl. .......... 210/252; 210/85; 210/88; 210/96.1; 700/282; 700/83; 715/772; 417/43; 417/44.1

(58) Field of Classification Search .................. None
See application file for complete search history.

(56) References Cited

U.S. PATENT DOCUMENTS

| | | |
|---|---|---|
| 5,422,014 A | 6/1995 | Allen et al. |
| 6,125,481 A | 10/2000 | Sicilano |
| 2007/0049388 A1 | 3/2007 | Henry et al. |
| 2007/0106403 A1 | 5/2007 | Emery et al. |
| 2007/0114162 A1 | 5/2007 | Stiles et al. |
| 2007/0154322 A1 | 7/2007 | Stiles, Jr. et al. |
| 2009/0200245 A1 | 8/2009 | Steinbrueck et al. |

*Primary Examiner* — Krishnan S Menon
(74) *Attorney, Agent, or Firm* — Bryan Cave LLP

(57) ABSTRACT

A system for controlling water within an aquatic facility includes a water chemistry controller, a variable rate water pump adapted to move water in the facility, and a variable rate motor driver operationally coupled to the water pump for variably energizing the water pump. The variable rate motor driver is coupled to the water chemistry controller to allow the water chemistry controller to manage the operation of the water pump.

3 Claims, 8 Drawing Sheets

SYSTEM FOR CONTROLLING WATER IN AN AQUATIC FACILITY

CROSS REFERENCE TO RELATED APPLICATIONS

This application is a division of U.S. application Ser. No. 12/366,970, filed Feb. 6, 2009, which claims the benefit of priority of U.S. Provisional Application No. 61/065,052, filed on Feb. 8, 2008. The contents of the prior applications are hereby incorporated by reference in their entirety for all purposes

FIELD OF THE INVENTION

This invention relates generally to swimming pool control systems and, in particular, to an integrated water chemistry controller capable of controlling the operation of a variable rate water pump.

BACKGROUND OF THE INVENTION

A typical aquatic facility such as a commercial swimming pool includes a number of components for managing and controlling the movement of and the quality of the water. For example, in addition to various filters and pumps, a conventional water chemistry controller controls the feeding of various chemicals into a pool or stream of water based on a number of factors, including the reading from one or more water chemistry sensors. The conventional water chemistry controller is typically microprocessor-based and includes a user interface customized to the aquatics application.

Water pumps, including variable rate water pumps, are also known in the art. A typical variable rate water pump used in an aquatic application includes a controller having a general-purpose user interface that is not tailored to the aquatics application or familiar to users of pumps in an aquatics setting. Installation of a conventional variable rate water pump into an aquatic application typically requires the operator to learn a control interface unique to the variable rate water pump.

A typical aquatic facility is designed with a minimum turnover rate, which indicates the amount of time for the entire body of water to pass through the water chemistry/filtration system. For example, a four-hour turnover rate means that the entire body of water should be processed six times each day. If the minimum turnover rate is not maintained, the quality of the water may be adversely impacted. From this perspective, in addition to the chemical/filtration subsystem, the main circulation pump may impact the water quality.

In conventional aquatic applications, the chemistry/filtration systems are separate from the water movement (i.e., pump) systems. Combining the management of these two systems by integrating the control and operation of the pump control system with the water chemistry system would provide many advantages. For example, allowing the water chemistry system to manage the flow rate of water in the aquatic facility may improve overall water quality and, in many instances, reduce energy usage.

SUMMARY OF THE INVENTION

According to one aspect of the present invention, a system for controlling water within an aquatic facility includes a water chemistry controller, a variable rate water pump adapted to move water in the facility, and a variable rate motor driver operationally coupled to the water pump for variably energizing the water pump. The variable rate motor driver is coupled or networked to the water chemistry controller to allow the water chemistry controller to manage the operation of the water pump. Thus, the water chemistry controller produces a series of control signals that are provided to the variable rate motor driver to manage the operation of the water pump. In addition, the variable rate motor driver may produce one or more pump status signals indicative of the operation of the associated water pump. The water chemistry controller may then monitor the pump status signals, use those signals to control the pump, and report operational data to a user of the system. The system may also include a user interface to allow a user to modify the operation of the water pump by altering the control signals.

BRIEF DESCRIPTION OF THE FIGURES

These and other features, aspects and advantages of the invention will become more fully apparent from the following detailed description, appended claims, and accompanying drawings, wherein the drawings illustrate features in accordance with an exemplary embodiment of the present invention, and wherein:

DETAILED DESCRIPTION OF THE INVENTION

Figure 1:
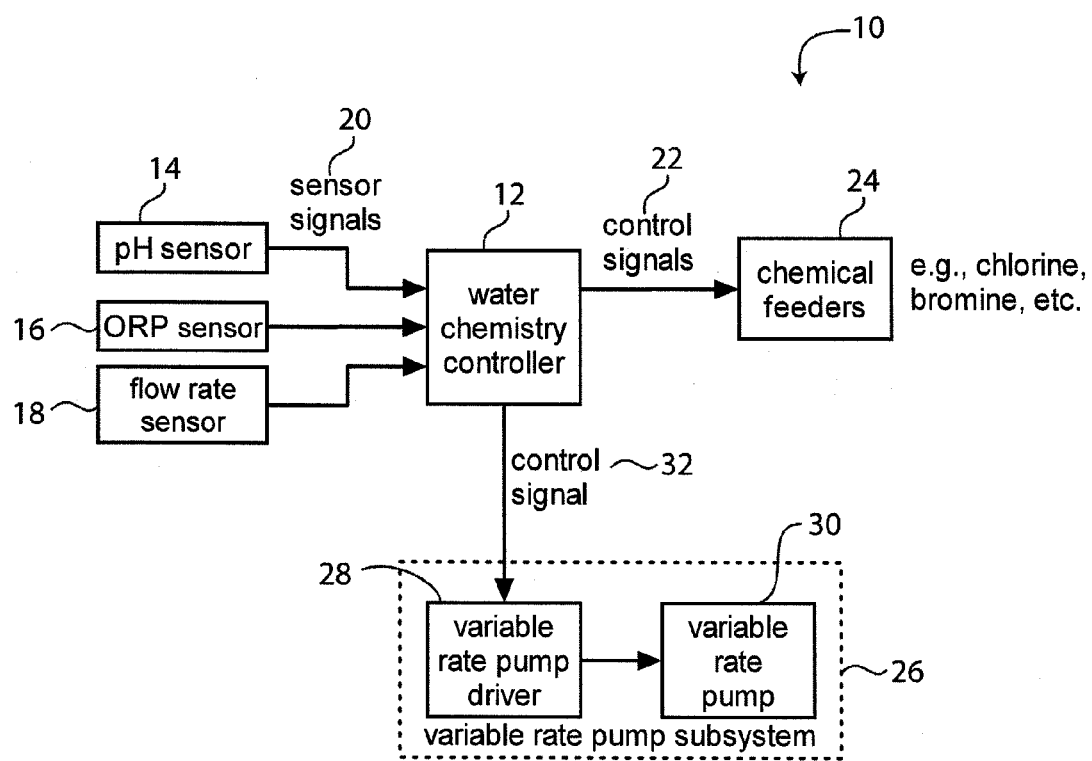
FIGS. 1-5 are block diagrams illustrating the principal components of various embodiments the system for controlling water within an aquatic facility.

Referring to FIG. 1, the principle components of one embodiment of the system 10 for controlling water within an aquatic facility are illustrated. The system 10 may be used in connection with the operation of any form of aquatic facility, for example, a family water recreation facility that may include features such as a swimming pool, a spa, whirlpool, and other features such as water jets, water slides, river rapid rides, waterfalls, decorative fountains, spillways, buckets, lazy rivers, and the like. The system 10 manages at least two principal water management functions. First, the system 10 controls the water chemistry by sensing various water chemistry attributes such as pH and oxidation-reduction potential ("ORP") and, as necessary, controls the discharge of chemicals such as chlorine and bromine into the water. Second, the system manages the movement of water through the facility by controlling the operation of one or more variable rate water pumps. The pumps may include one or more main circulation pumps and various feature pumps, i.e., those pumps designed for use with features such as a water slide, lazy river, etc. In addition to the components identified in FIG. 1, those skilled in the art will recognize that the typical aquatic facility includes other components and systems such as filters, strainers, drains, and heaters.

The system 10 includes a water chemistry controller 12 that continuously monitors and controls the chemical balance in the water. The water chemistry controller 12 receives inputs from various conventional sensors. For example, the system 10 may include a pH sensor 14 and an ORP sensor 16, both designed to sense and measure the chemical properties of the water in a particular location within the water facility. The water chemistry controller 12 may also control other components of the aquatic facility such as managing the operation of the filter and backwash cycles. The water chemistry controller preferably includes a microprocessor-based computing element, input and output interfaces (including digital and analog), and a user interface, which may include a display, buttons, switches, indicators, etc. The computing element is programmed to control the overall operation of the water chemistry controller 12. Although the water chemistry controller 12 is illustrated as a single box, those skilled in the art will appreciate that the functions of the controller 12 may be distributed over multiple pieces of computing hardware.

One or more flow rate sensors 18 may be positioned at various locations in the body of water to sense and measure the rate of flow of the water passing through or by the sensor 18. The flow rate sensors 18 are preferably arranged downstream of the one or more water pumps described below to monitor the flow rate generated by the pumps.

The sensors 14, 16, 18 produce output sensor signals 20, which are fed as inputs into the water chemistry controller 12. The controller 12 uses these signals 20 to determine the amount of chemicals to be added to the water to maintain the body of water at a precise pH concentration and ORP level or PPM level. The sensor signals 20 may be unique to the particular sensor used (e.g., a voltage signal from the pH sensor 14) or the signals 20 may be in a standard, interchangeable form (e.g., a 4-20 mA signal from a commodity flow rate sensor 18).

The water chemistry controller 12 is configured to control and actuate one or more chemical feeders 24. These chemical feeders 24 may include chlorine and/or bromine dispensers for dispensing chlorine, bromine and/or ozone, etc. into the pool or other body of water upon the actuation thereof. The water chemistry controller 12 controls the series of chemical feeders 24 using control signals 22 for actuating the feeders 24 only when certain conditions are met. The actuator control signals 22 are used to maintain water chemistry at desired set points. The actuator control signals 22 may have different forms. For example, the chemical feeders 24 may accept a 4-20 mA actuator signal.

The system 10 further includes one or more variable rate pump subsystems 26 that include, in one embodiment, a variable rate pump driver 28 operatively connected to drive a variable rate pump 30 that has a variable (i.e., controllable) pumping rate. The variable rate pump driver 28 is an actuator that accepts an electronic control signal 32 from the water chemistry controller 12 indicating the desired pumping rate and transforms that signal 32 into a form necessary to drive the motor of the water pump 30 at the desired rate. The electronic control signal 32 may be delivered to the variable rate pump subsystem 26 as an analog signal (e.g., 4-20 mA current loops) or in a digital form, such as a MODBUS protocol interface via RS-485 or Ethernet. The variable rate pump allows for the adjustment of the pump rate of the main recirculation pump for the body of water or a secondary pump, such as a feature pump for a water slide, lazy river, etc. The variable rate pump 30 may be a centrifugal pump powered by a variable frequency drive motor such as a 4SPC Series pump available from Marlow Pumps of Morton Grove, Ill. The variable rate pump driver 28 and the variable rate pump 30 may be disposed within a single packaging unit.

The water chemistry controller 12 manages the overall operation of the one or more variable rate pump subsystems 26. The water chemistry controller 12 sets or adjusts the pump rate (via the variable rate pump driver 28) based on, among other inputs and settings, the prior and current input signal from the flow rate sensor 18 associated with the variable rate pump subsystem 26, and an algorithm built into the water chemistry controller 12. By way of example only, the algorithm may direct the variable rate pump driver 28 based on a specific set flow rate or may be designed to maintain a constant flow rate. Alternative flow rate settings may be used, for example, selecting a lower flow rate for overnight operation. Where the water pump is associated with a particular water feature, for example, a water slide, the algorithm may be designed to shutdown the pump by gradually ramping down the pump rate to prevent water hammer that commonly results from the backrush of water when the pump suddenly stops. In this manner, the water chemistry controller 12 acts as a variable rate pump controller to determine the desired pumping rate for a variable rate water pump based in part on sensor input. Because the water chemistry controller 12 is responsible for overall water quality of the aquatic facility, it has the opportunity to alter the flow rate of the water in the facility to assist in water quality improvements. For example, the water chemistry controller 12 may increase the pump rates to achieve higher water quality during peak usage periods or reduce energy consumption during other periods of use. The system 10 illustrated in FIG. 1 does not require a separate flow rate sensor coupled to both the water chemistry controller 12 and the variable rate pump subsystem 26. Thus, a simple and conventional variable rate pump subsystem 26 may be used because the only input it requires is the control signal 32 from the water chemistry controller 12.

Figure 2:
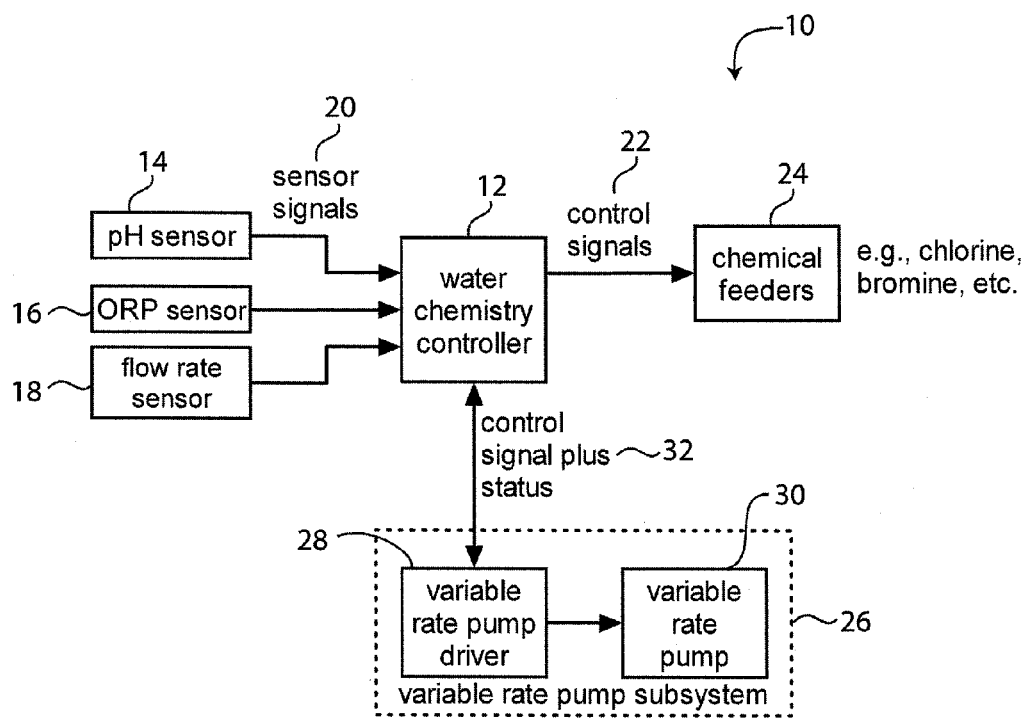

In another embodiment, as illustrated in FIG. 2, the variable rate pump subsystem 26 provides status information (e.g., current draw for the pump) and alarm indications to the water chemistry controller 12 to assist the controller 12 in managing the operation of the pump subsystem 26. In this embodiment, the variable rate pump subsystem 26 acts as both an actuator accepting a control signal from the water chemistry controller 12, and as a sensor providing an input signal to the water chemistry controller 12. The status information from the variable rate pump subsystem 26 may be delivered either via analog signal(s) (e.g., 4-20 mA current loop) or digital signaling (e.g., MODBUS or the like).

The water chemistry controller 12 may also include the ability to calculate the total dynamic head of the variable rate pump 30. For example, in a system using a circulation pump, a conventional pressure sensor may be located upstream of the pump to measure the strainer pressure and a second conventional pressure sensor may be located downstream of the pump to measure the filter pressure. The sensor readings from the pressure sensors are fed into the water chemistry controller 12. Based on the readings from these two pressure sensors, the total dynamic head of the circulation pump may be calculated using well-known equations. The controller 12 may also calculate the total dynamic head of any feature pumps included in the system 10 by having the controller 12 read inputs from pressure sensors located on the influent and effluent streams of the feature pump. If the variable rate pump subsystem 26 provides the current draw for the variable rate pump 30 to the water chemistry controller 12, the controller 12 may have the ability to provide information on the overall efficiency of the pump 30 using both the current draw and the calculated total dynamic head, which may indicate that the pump 30 requires servicing or is wearing down.

Figure 3:
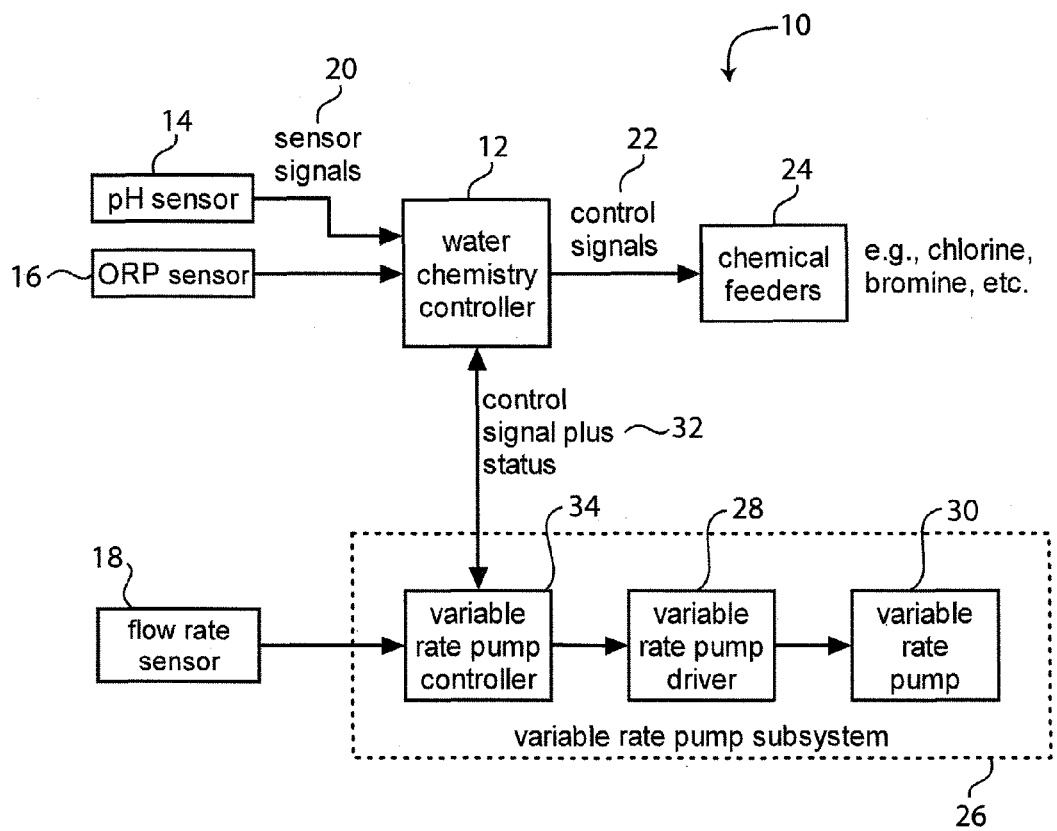

FIG. 3 illustrates another embodiment of the system 10 for controlling water in an aquatic facility. In this embodiment, the variable rate pump subsystem 26 includes a variable rate pump controller 34 that performs pump control based in part on a flow rate sensor 18 that provides its input signal directly to the pump controller 34 rather than the water chemistry controller 12. In this embodiment, there preferably still includes a two-way communication path between the water chemistry controller 12 and the variable rate pump system 26, as shown by control signals/status line 32. Through this communication path, the water chemistry controller 12 may obtain flow rate information from the flow rate sensor 18 coupled to the variable rate pump controller 34, thus eliminating the need for a redundant flow sensor coupled to the water chemistry controller 12.

In the embodiment illustrated in FIG. 3, the variable rate pump subsystem 26 is controlling the pump rate. For example, the variable rate pump subsystem 26 may be controlling the pump rate at a fixed pump rate setting specified by the operator (via an interface associated with the controller), without any flow rate sensor feedback, or actively controlling the pump rate based upon an input from the flow rate sensor 18 to maintain a flow rate setting specified by the operator. Although in this embodiment the variable rate pump subsystem 26 is controlling the operation of the pump 30, the water chemistry controller 12 retains the ability to override the local decisions of the variable rate pump subsystem 26 (i.e., manage the variable rate pump subsystem 26). For example, the operating hours of the aquatic facility are known to the water chemistry controller 12. The water chemistry controller 12 may use this information to maintain alternate water chemistry setpoints during non-operating hours. If the system 10 illustrated in FIG. 3 was used in an aquatic facility with multiple variable rate pump subsystems 26 for circulation and feature pumps, the water chemistry controller 12 may override the operation of each variable rate pump subsystem 26 during the non-operating hours using an alternative pump rate profile. In this manner, energy savings may be realized without requiring the operator to redundantly change the operating profile of each variable rate pump subsystem 26.

As another example, when the water chemistry controller 12 is also managing the filter operation and backwash cycle, the water chemistry controller 12 may need to override the operation of the circulation pump during certain portions of the backwash cycle. For example, the water circulation (flow rate) may be slowed or stopped to allow the valves to change position to reverse the direction of flow through the filter being backwashed. As another example, when the system 10 is used in connection with a competition pool, the circulation system (flow rate) may need to be slowed down or stopped during the actual race. The purpose is to prevent an unfair advantage to any swimmer based upon the lane they have and the pattern of water flow within the pool, which may be especially important in older pools that were not specifically designed as competition pools. In yet another example, a blended flow rate (one flow rate during operating hours, an alternate flow rate after hours) could be adjusted in real-time by the water chemistry controller 12 based upon water quality parameters. If the pH or ORP values change during heavily loaded conditions, the water chemistry controller 12 may increase the flow rate to process the water more frequently, but not so high that the filtration system becomes ineffective. The off-hours flow rate would then be set to the lowest level possible to maintain the designed average turnover rate for the pool. A real-time algorithm such as this would override the local control settings of the variable rate pump subsystem 26.

In the embodiment of FIG. 3, the water chemistry controller 12 preferably retains the ability to exercise control over the variable rate pump subsystem 26. This may be particularly beneficial in managing a staged startup or shutdown of the system. For example, the water chemistry controller 12 may be programmed with a desired startup/shutdown sequence for each of a plurality of variable rate pumps 30 (for example, one circulation pump and a number of feature pumps). In addition to the sequence in which the various pumps 30 should be started or shutdown, the water chemistry controller 12 may be programmed with a speed profile for each of the plurality of pumps 30. The water chemistry controller 12 may then generate a control signal 32 for each of the variable rate pump subsystems 26 in accordance with the desired startup/shutdown sequence and speed profiles and provide the control signal to the control input of each variable rate pump controller 34. The variable rate pump controller 34 would then controllably power the speed of each water pump 30 according to the control signal. The startup/shutdown process may also be used with the embodiments described herein, including the system described in connection with FIG. 2, wherein the water chemistry controller 12 provides a control signal 32 directly to the variable rate pump driver 28.

Figure 4:
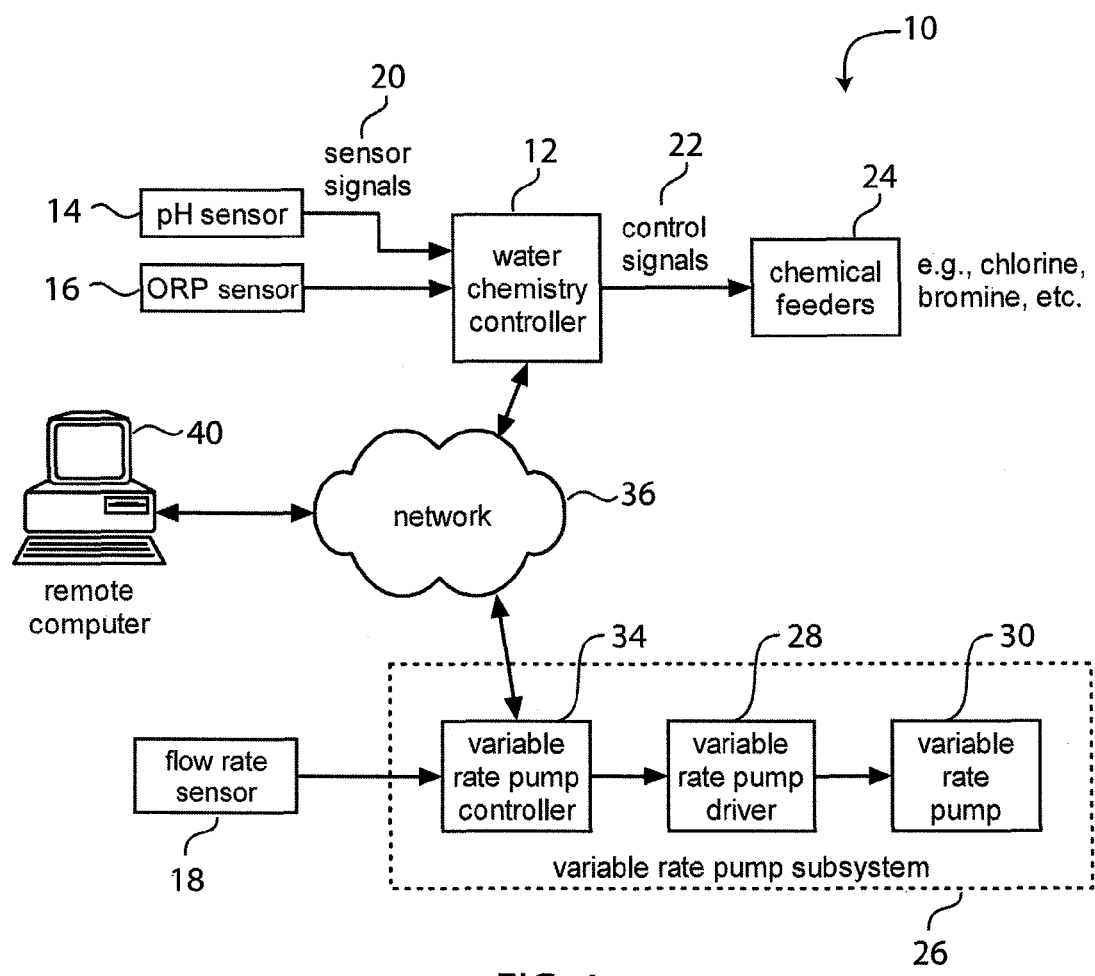

FIG. 4 illustrates another embodiment of the system 10 for controlling water within an aquatic facility. In this embodiment, both the water chemistry controller 12 and the variable rate pump subsystem(s) 26 are connected to a network 36, such as a local area network or a wide area network (possibly the Internet). A remote computer 40, such as a conventional PC, may be connected to the network 36. The water chemistry controller 12 manages the operation of the variable rate pump subsystem 26 by sending the signal through the network 36 and receives status signals from the variable rate pump subsystem 26 through the network 36. As described in greater detail below, the remote computer 40 has the ability to monitor the various control and status signals exchanged between the water chemistry controller 12 and the variable rate pump subsystem 26, as well as provide certain operating parameters to these components.

Figure 5:
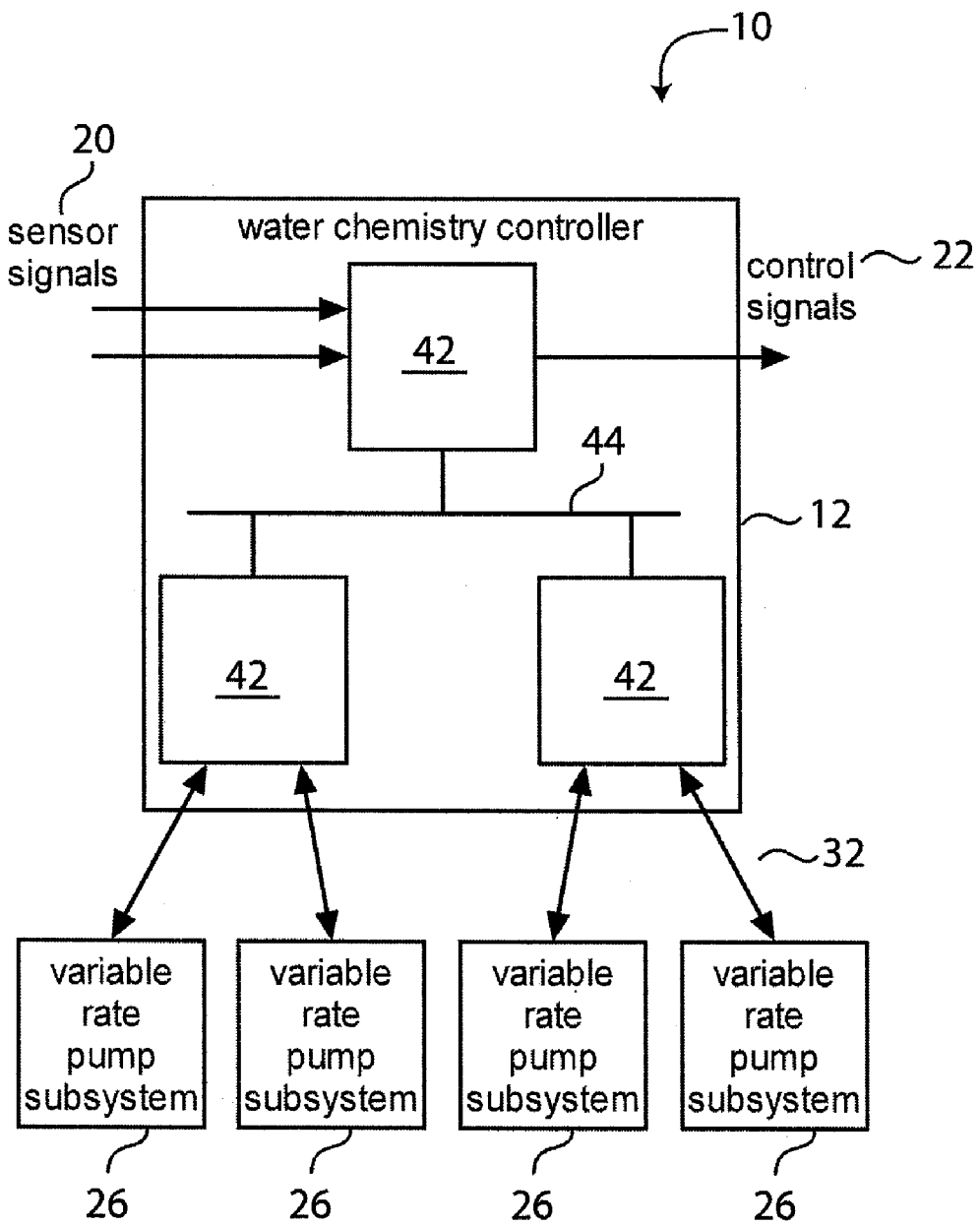

FIG. 5 illustrates a system 10 for managing water within an aquatic facility having multiple variable rate pump subsystems 26, for example, one subsystem for a circulation pump and a number of subsystems for various feature pumps. In such a system, the number of input and output connections between the water chemistry controller 12, including the physical wiring between such components, may make it difficult to contain the water chemistry controller 12 within one enclosure. Thus, the functions of the water chemistry controller 12 may be distributed across two or more processing elements 42, each of which may contain some combination of a microprocessor, control and status inputs and outputs, a user interface, etc. The various processing elements 42 may be contained within different physical enclosures and networked together over a data bus such as MODBUS or a custom data interface 44. The sensor signals 20 may be coupled into one or more of the processing elements 42 and the control/status signals 32 to/from the variable rate pump subsystems 26 may be coupled to different processing elements 42 as illustrated in FIG. 5.

A networked system of variable rate pump subsystems 26 controlled by a common water chemistry controller 12 offers many benefits. For example, the water chemistry controller 12 may be programmed to control the operation and the speed of the water pumps 30 based on a desired startup or shutdown sequence based on, for example, energy or water usage demands. In addition to a sequenced startup or shutdown of the pumps 30, the networked pumps 30 may be controlled based on a predetermined speed profile embedded within the water chemistry controller 12. The water chemistry controller 12 would control the networked pumps 30 by generating an appropriate control signal 32 in accordance with the desired startup or shutdown sequence and/or speed profiles and providing the control signals 32 as an input to the appropriate variable rate pump driver 28. The variable rate pump driver would, in turn, controllably power the speed of its associated variable rate pump 30 according to the control signal 32.

The water chemistry controller 12 may also be programmed to control the operation of the water pumps 30 based on the current operation of the chemical feeders 24. For example, in a typical application, the water chemistry controller 12 may direct a water pump 30 controlling water circulation within an aquatic facility to a lower speed at night (resulting in a lower overall water circulation rate). During this mode, if the water chemistry controller 12 determines the need to add chemicals to the water, the water chemistry controller 12 may direct the water pump(s) to a higher or normal speed to allow the dispensed chemicals to disperse throughout the aquatic facility as quickly as possible. Alternatively, the water chemistry controller 12 may leave the pumps operating at a reduced speed and, instead, may automatically switch to a time-based-proportional mode for feeding chemicals. Thus, the water chemistry controller 12 may direct the chemical feeders 24 to feed only a fraction of every minute (wherein the fraction is determined by distance from set point), rather than continuously feeding until the set point is achieved. In this mode, the time-based-proportional parameters may be based on the current operation state of the water pump(s) in order to provide a more effective and/or efficient chemical dosing profile. As another alternative, the water chemistry controller may suspend chemical dispensing when the water pumps are in a reduced circulation mode. Thus, allowing the water chemistry controller 12 to control both chemical dispensing and water circulation results in greater overall management of the aquatic facility.

Figure 6:
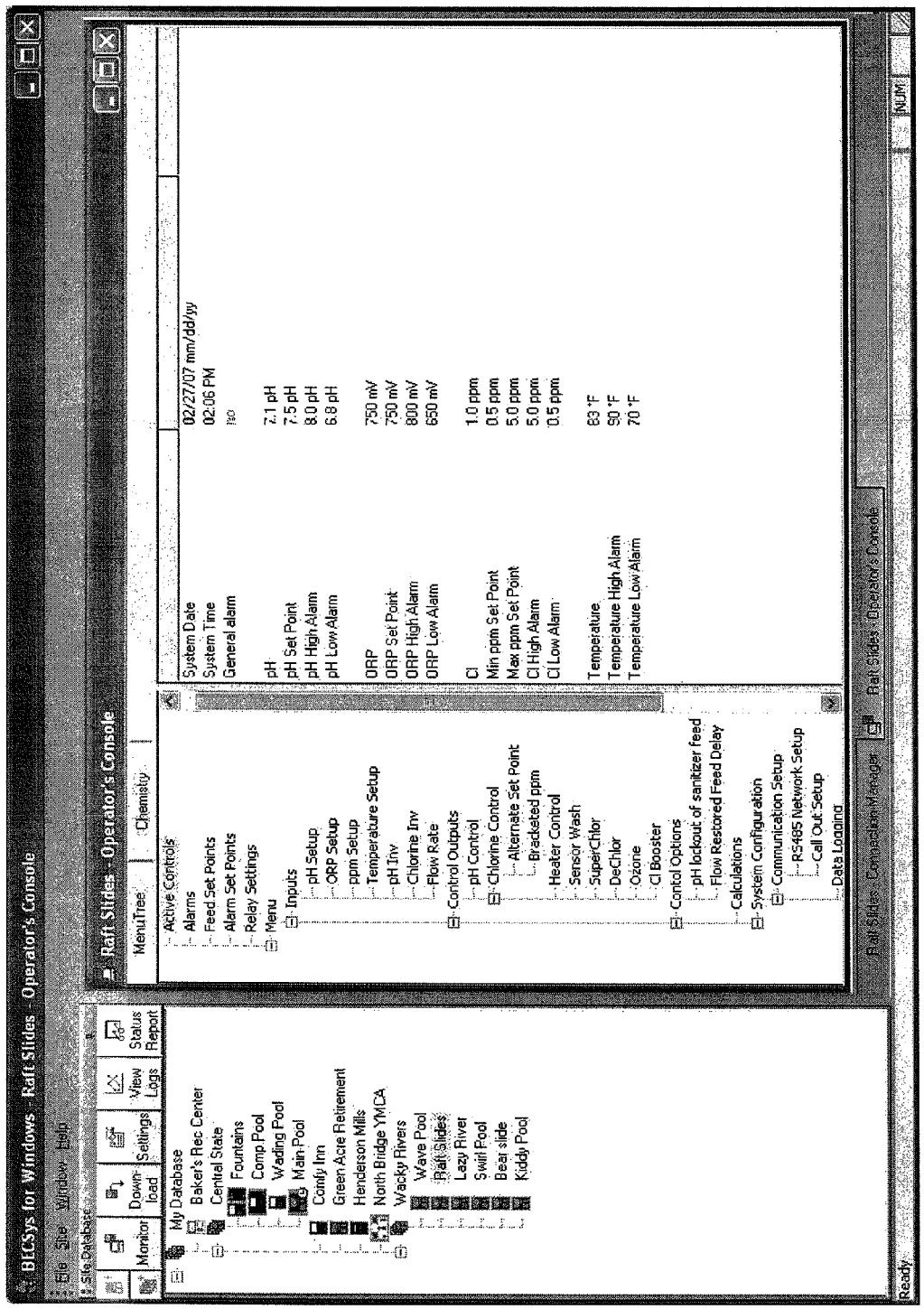
FIG. 6 is a representative user interface illustrating the setting of various parameters for the system for controlling water within an aquatic facility.

The water chemistry controller 12 preferably includes a user interface to provide a means of entering control parameters, settings and other data and to provide status information to the operator for use in monitoring the operational status of the system 10. Preferably, the system 10 includes a unified user interface—a single interface for setting the operational parameters for control of the water chemistry and control of the various water pumps. A representative user interface is shown in FIG. 6, which may be accessed remote from the physical location of the aquatic facility via a connection to the water chemistry controller 12, such as is illustrated in FIG. 4. The user interface preferably provides the ability to modify system inputs and parameters related to various attributes such as pH, ORP, ppm, temperature, flow rates, etc. In the representative example illustrated in FIG. 6, the user has selected the pH setup menu, which then displays the various user-controlled parameters on the right hand side of the display. These parameters, including the desired pH, high and low alarm states and other parameters, may be adjusted as necessary or desired by the operator using conventional means.

The user interface of the water chemistry controller 12 may provide an application-specific user interface for entry of the variable rate pump subsystem 26 control parameters. For example, if the aquatic facility includes a water slide, the water chemistry controller 12 may be programmed to assist in reducing or eliminating water hammer resulting from stopping a water slide pump by gradually ramping the speed of the water pump 26. The user interface of the water chemistry controller 12 may request certain key information from the user regarding the water slide, such as the height of the slide, pipe diameter, size of the pump, and other features. Based on these parameters, the water chemistry controller 12 can automatically determine the optimal way to slow down and shut off the water pump associated with the water slide.

Figure 7:
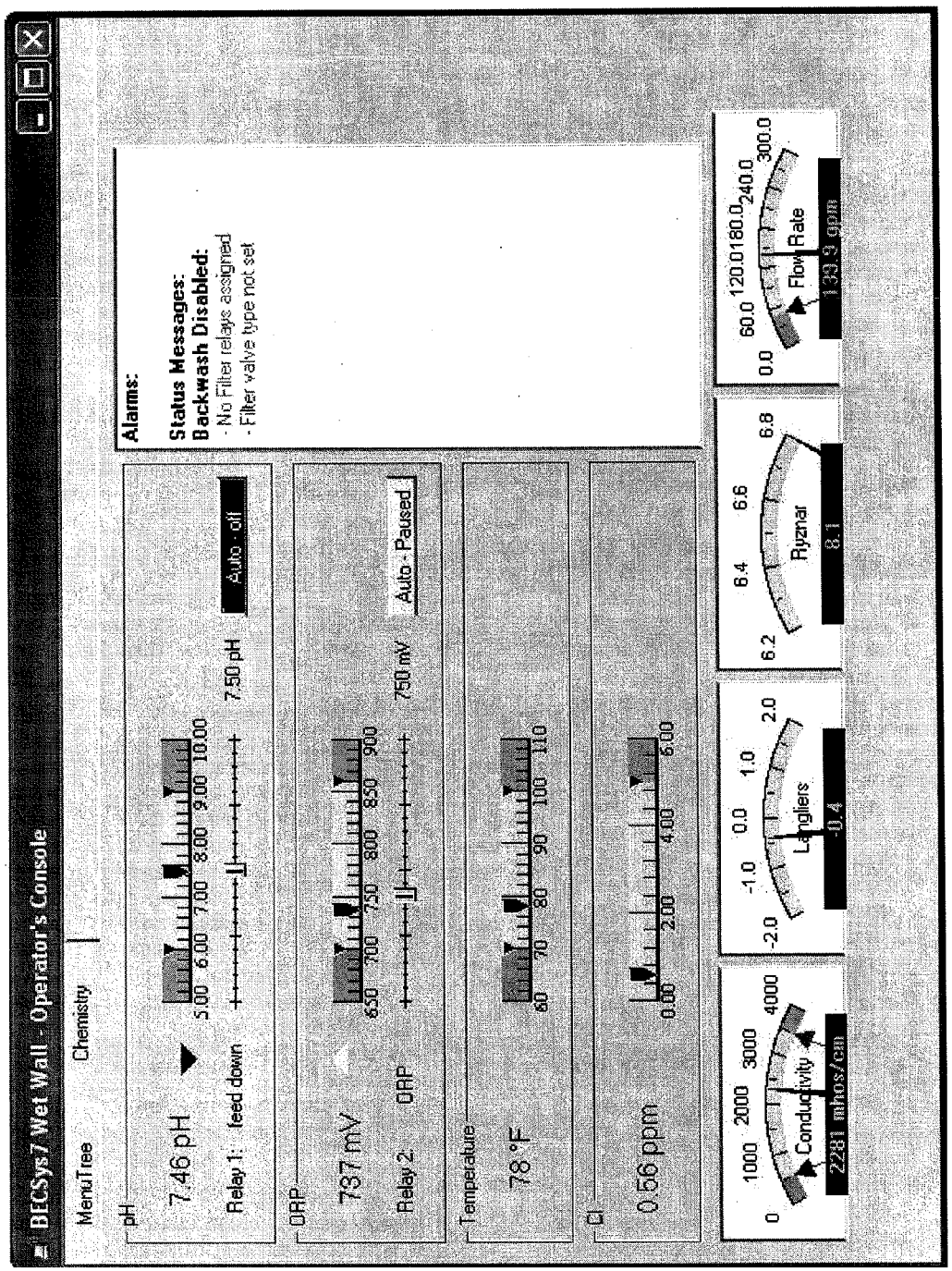
FIG. 7 is a representative user interface illustrating the display of the current status of the system for controlling water within an aquatic facility.

As illustrated in FIG. 7, the user interface of the water chemistry controller 12 may graphically display current status parameters such as current pH reading, flow rate, and temperature, as well as the state of alarm conditions. These status parameters may relate to both the water chemistry and pump operations.

Figure 8:
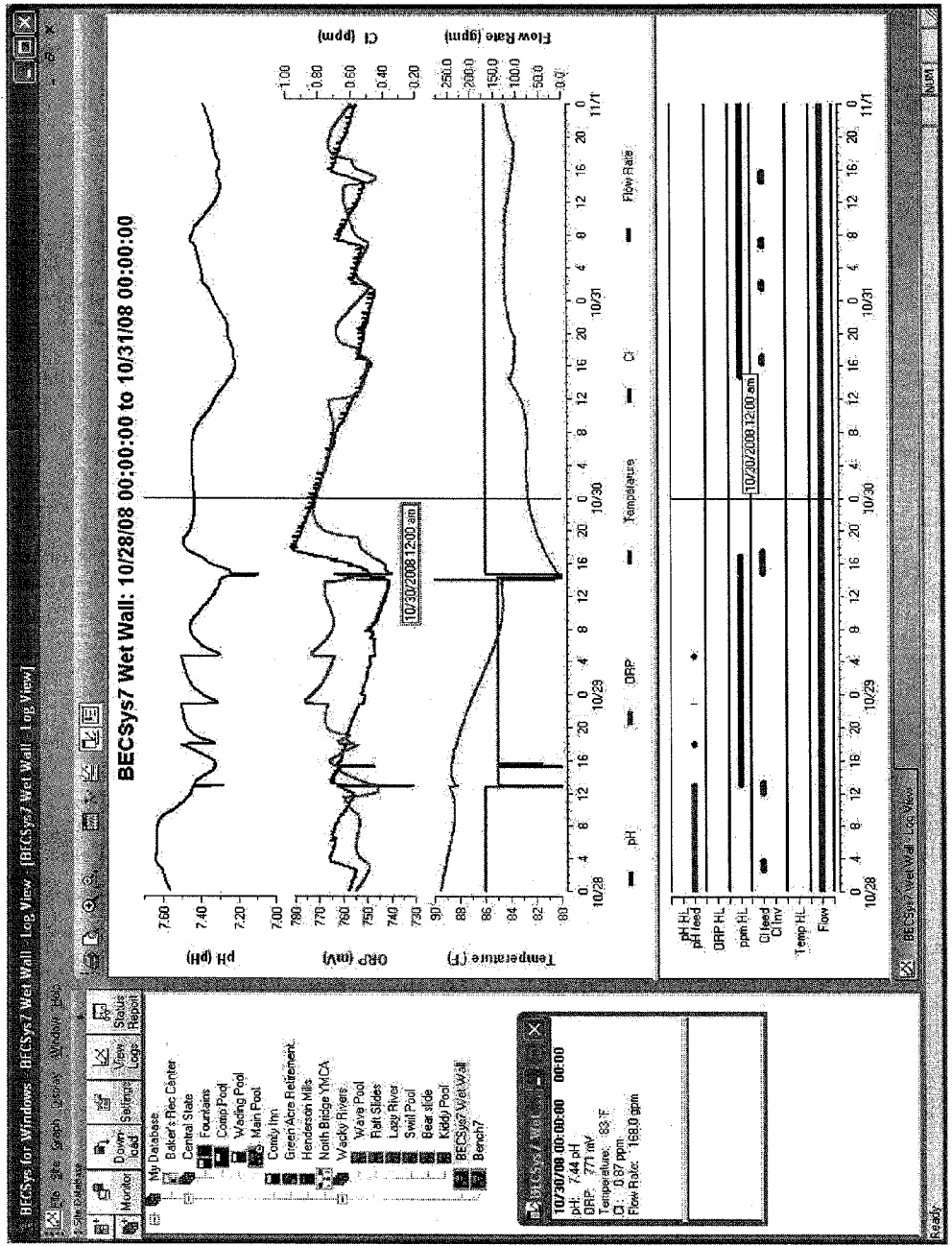
FIG. 8 is a representative user interface illustrating a display of certain historical information for the system for controlling water within an aquatic facility.

The water chemistry controller 12 preferably has the ability to log data regarding the system 12, including data received from the variable rate pump subsystem 26, such as status or performance data and abnormal operation (e.g., alarm) indications, into a water management log. The data may include status information, for example, the current state of the system including all inputs and variables, system events such as an abnormal condition, and/or the modification of a user set parameter. The status and abnormal information received from the variable rate pump subsystem 26 may be integrated with information regarding the water chemistry system and displayed to the user via the user interface on common charts and graphs such as is illustrated in FIG. 8. In addition, the water chemistry controller 12 may integrate any abnormal indications received from the variable rate pump subsystem 26 into the abnormal information related to water chemistry. The operator of the system 10 may then receive notifications of pump and/or flow rate problems by the same mechanism they conventionally receive water chemistry notifications, for example via the user interface, a remote PC, telephone, e-mail, on-site audible and/or visual alarms, etc.

The user interface of the water chemistry controller 12 may be accessed remotely via an off-site or networked PC, handheld computer, cell phone or the like. This communication may be facilitated via Ethernet, serial connectivity, or wirelessly to external equipment such as PCs, personal digital assistants, the Internet or other networks. Referring again to FIG. 4, the user interface as described in connection with FIGS. 6-8, or some portion or derivative thereof, may be included in the remote computer 40. It is known in the art to have software executing on computer networked to a variable rate pump controller or a water chemistry controller to enable viewing status, setting parameters, accessing logs, and the like, of each of the controllers. In these prior art systems, the remote computer would execute one program, with a custom user interface, for the water chemistry controller and a different program, with a different user interface, for the variable rate pump controller. The current invention includes a single computer program executing on the remote computer 40 having a user interface that simultaneously provides unified access to both the water chemistry controller 40 and the variable rate pump controller 34 via the network 36. The user interface preferably allows the operator to setup the variable rate pump subsystem 26 in terms applicable to an aquatic application (e.g., turnover rate for the pool, height of a water slide, etc.). The user interface can provide a common menu system for setup, monitoring and data logging and provide unified views of status and historical logs.

Allowing an operator to control the operation of the one or more variable rate pump subsystems 26 using the water chemistry controller 12 provides many benefits. For example, the operator may program the operation of the pump subsystems 26 using the familiar user interface of the water chemistry controller 12, thus avoiding the need to become expert in the setup and operation of variable rate drives. In addition, the operator can easily change the operation (e.g., starting and stopping times) via one user interface as opposed to visiting each pump station. In addition, the integrated system described herein reduces the need for an operator to be trained on and support multiple systems.

An integrated system provides other benefits. For example, during the overnight hours when the aquatic facility is closed, a much lower water turnover rate may be acceptable and reduce overall operating costs by reducing the amount of energy consumed by the facility. Alternatively, a blended approach may be used wherein an increased turnover rate is used during operating hours and a decreased turnover rate is used while the facility is empty, resulting in an average turnover rate that exceeds the minimum designed turnover rate. Accomplishing this task in the water chemistry controller provides the ability to assure that such changes do not adversely affect water quality.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention should be limited only to extent required by the appended claims and the rules and principals of applicable law.

The invention claimed is:

1. A system for controlling water within an aquatic facility comprising:
   a variable rate pump subsystem comprising a variable rate water pump adapted to move water in the facility, a variable rate motor driver operationally coupled to the water pump and adapted for variably energizing the water pump, and a variable rate pump controller associated with the variable rate motor driver to control the operation of the motor, the pump controller producing status signals indicative of the operation of the associated water pump;
   a flow sensor for sensing a rate of water flow through the water pump and producing a flow rate signal indicative of the water flow rate to the variable rate pump controller, wherein the variable rate pump controller has the ability to manage the operation of the water pump based on the flow rate signal; and
   a water chemistry controller coupled to the variable rate pump controller, wherein the water chemistry controller produces a series of control signals that are provided to the variable rate pump controller to override the variable rate pump controller and manage the operation of the water pump.

2. The system of claim 1 wherein the status signals further comprise the flow rate signal and wherein the status signals are provided to the water chemistry controller.

3. The system of claim 1 wherein the water chemistry controller comprises a user interface to allow a user to modify the operation of the water pump by altering the control signals.

* * * * *